US011968559B2

(12) United States Patent
Yao et al.

(10) Patent No.: US 11,968,559 B2
(45) Date of Patent: Apr. 23, 2024

(54) APPARATUS AND METHOD FOR 5G QUALITY OF SERVICE INDICATOR MANAGEMENT

(71) Applicant: Intel Corporation, Santa Clara, CA (US)

(72) Inventors: Yizhi Yao, Chandler, AZ (US); Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 127 days.

(21) Appl. No.: 17/320,902

(22) Filed: May 14, 2021

(65) Prior Publication Data

US 2021/0345160 A1 Nov. 4, 2021

Related U.S. Application Data

(60) Provisional application No. 63/025,023, filed on May 14, 2020.

(51) Int. Cl.
*H04W 28/02* (2009.01)
*H04W 28/24* (2009.01)

(52) U.S. Cl.
CPC ... *H04W 28/0268* (2013.01); *H04W 28/0236* (2013.01); *H04W 28/24* (2013.01)

(58) Field of Classification Search
CPC ......... H04W 28/0268; H04W 28/0236; H04W 28/24
See application file for complete search history.

(56) References Cited

U.S. PATENT DOCUMENTS

2020/0145876 A1* 5/2020 Dao ............... H04W 28/06

OTHER PUBLICATIONS

3GPP TS 23.501, V.16.4.0, (Year: 2020).*
3GPP TS 23.501; "Technical Specification Group Services and System Aspects; System architecture for the 5G System (5GS); Stage 2;" published Jun. 2021; 452 pages.
3GPP TS 28.541; "Technical Specification Group Services and SystemAspects; Management and orchestration; 5G Network Resource Model (NRM); Stage 2 and stage 3," published Apr. 1, 2020; 324 pages.
3GPP TS 28.622; "Technical Specification Group Services and System Aspects; Telecommunication management; Generic Network Resource Model (NRM); Integration Reference Point (IRP); Information Service (IS)," published Jun. 2021; 66 pages.

* cited by examiner

*Primary Examiner* — Mandish K Randhawa
(74) *Attorney, Agent, or Firm* — Alliance IP, LLC

(57) ABSTRACT

A device to host a service producer in a 5G system (or 5G system architecture), a method to be performed at the device, and a non-transitory storage device storing instructions to be executed at the device. The method includes: decoding a request from a service consumer to manage one or more 5G quality of service (QoS) indicators (5QIs), each 5QI including a 5QI value and corresponding 5QI characteristics; configuring one or more network functions (NFs) of the 5GS with the 5QIs based on the request; and encoding for transmission to the service consumer a message including a result of managing the one or more 5QIs.

17 Claims, 7 Drawing Sheets

NRM fragment for configurable 5QIs in 5GC

Figure 5.2.1.2-y: Inheritance hierarchy for IOC 5qiDscpMapping

APPARATUS AND METHOD FOR 5G QUALITY OF SERVICE INDICATOR MANAGEMENT

CROSS REFERENCE TO RELATED APPLICATIONS

This application claims the benefit of and priority from U.S. Provisional Patent Application No. 63/025,023 entitled "METHOD AND SYSTEM FOR 5QI MANAGEMENT," filed May 14, 2020.

FIELD

Various embodiments generally may relate to the field of wireless communications in a cellular network.

BACKGROUND

Various embodiments generally may relate to the field of wireless communications. All communications within a same service in a Third Generation Partnership Project (3GPP) Fifth Generation (5G) network are typically configured with a same 5G Quality of Service (QoS) Indicator (5QI) value, which may be an integer. The nodes and functions within the 5G network need to be configured such that they all understand which 5QI value corresponds to which communication characteristics for a given service so that they are aware of QoS requirements during communication. A 5G core network (CN) in a 5G network may store information regarding the 5QI value for a service. Radio Access Networks (RANs) within the 5G system would need to understand the characteristics, such as priority level, delay budget, packet error rate, maximum data burst volume, average window. The RANs may be configured with information regarding a 5QI value and its associated characteristics for any given service such that the components of the 5G network understand the correlation between 5QI value and its characteristics during communication. Information Object Classes pertaining to 5QI values and chair characteristics are set forth for example in 3GPP TS 28.541: "5G NRMs," V16.4.1, 4/1/2020.

Mechanisms are needed to ensure that 5QI values and associated parameters are configured to a 5G network in order to ensure seamless network operation.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

In A 5G quality of service (QoS) model, there may be standardized Fifth Generation (5G) QoS indicators (5QIs) and non-standardized 5QIs. The non-standardized 5QIs including their QoS characteristics may need to be pre-configured to the 5G network functions (NFs) by an Operations Administration and Maintenance (OAM) system (see Third Generation Partnership Project (3GPP) Technical Specification (TS) 23.501).

Figure 1:
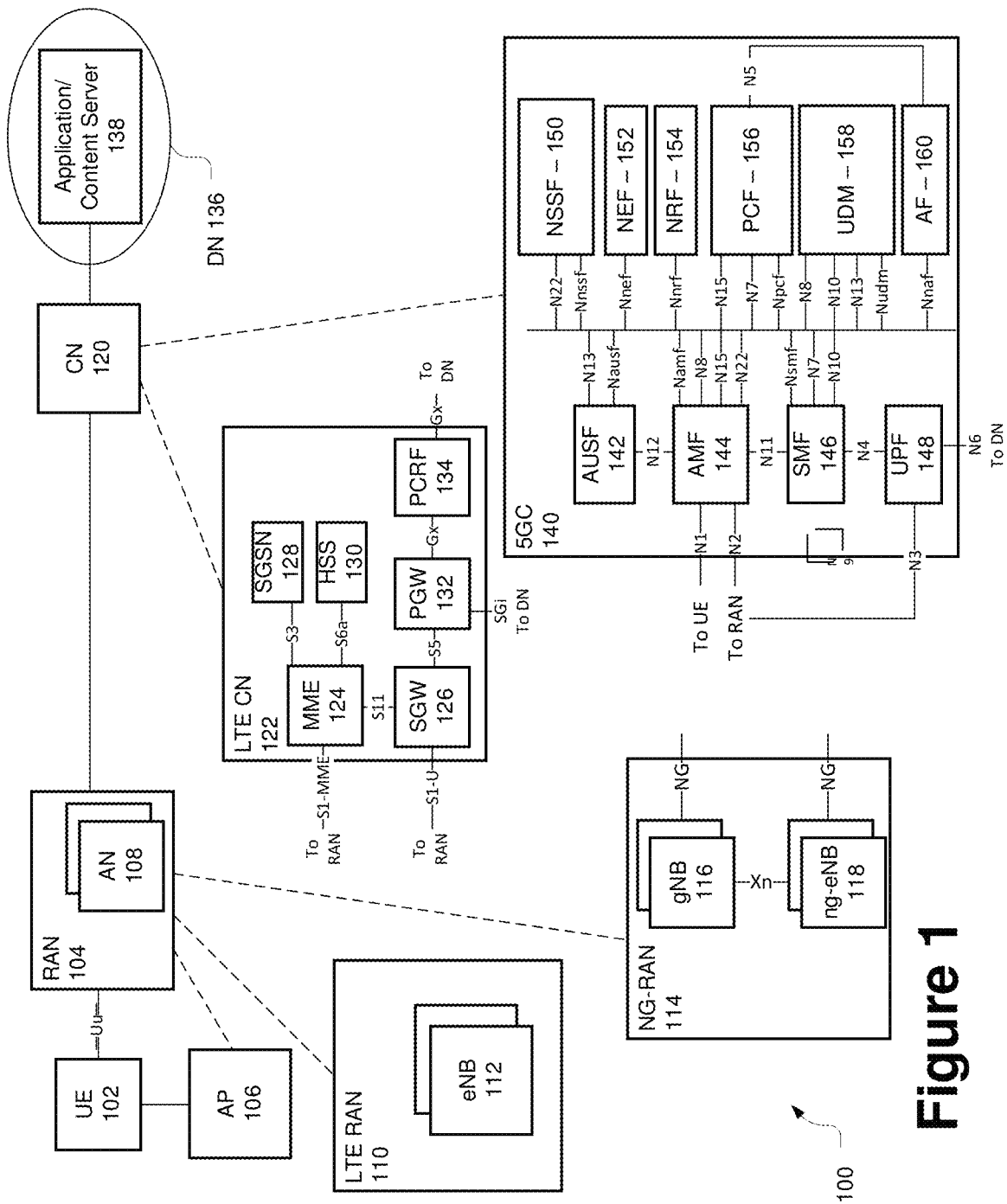
FIG. 1 shows a communication network according to some embodiments.

FIG. 1 illustrates a communication network 100 in accordance with various embodiments, the network including a 5G system architecture. The network 100 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 100 may include a user equipment (UE) 102, which may include any mobile or non-mobile computing device designed to communicate with a RAN 104 via an over-the-air connection. The UE 102 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 100 may include a plurality of UEs coupled directly with one another via a sidelink interface. The UEs may be machine-to-machine or device-to-device (M2M/D2D) devices that communicate using physical sidelink channels such as, but not limited to, physical sidelink broadcast channel (PSBCH), physical sidelink discovery channel (PSDCH), physical sidelink shared channel (PSSCH), physical sidelink control channel (PSCCH), physical sidelink feedback channel (PSFCH), etc.

In some embodiments, the UE 102 may additionally communicate with an access point (AP) 106 via an overthe-air connection. The AP 106 may manage a WLAN connection, which may serve to offload some/all network traffic from the RAN 104. The connection between the UE 102 and the AP 106 may be consistent with any IEEE 802.11 protocol, wherein the AP 106 could be a wireless fidelity (Wi-Fi®) router. In some embodiments, the UE 102, RAN 104, and AP 106 may utilize cellular-WLAN aggregation (for example, LWA/LWIP). Cellular-WLAN aggregation may involve the UE 102 being configured by the RAN 104 to utilize both cellular radio resources and WLAN resources.

The RAN 104 may include one or more access nodes, for example, AN 108. AN 108 may terminate air-interface protocols for the UE 102 by providing access stratum protocols including radio resource control (RRC), packet data convergence protocol (PDCP), radio link control (RLC), medium access control (MAC), and layer 1 (L1) protocols. In this manner, the AN 108 may enable data/voice connectivity between CN 120 and the UE 102. In some embodiments, the AN 108 may be implemented in a discrete device or as one or more software entities running on server computers as part of, for example, a virtual network, which may be referred to as a CRAN or virtual baseband unit pool. The AN 108 be referred to as a BS, gNB, RAN node, eNB, ng-eNB, NodeB, RSU, TRxP, TRP, etc. The AN 108 may be a macrocell base station or a low power base station for providing femtocells, picocells or other like cells having smaller coverage areas, smaller user capacity, or higher bandwidth compared to macrocells.

In embodiments in which the RAN 104 includes a plurality of ANs, they may be coupled with one another via an X2 interface (if the RAN 104 is an LTE RAN) or an Xn interface (if the RAN 104 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 104 may each manage one or more cells, cell groups, component carriers, etc. to provide the UE 102 with an air interface for network access. The UE 102 may be simultaneously connected with a plurality of cells provided by the same or different ANs of the RAN 104. For example, the UE 102 and RAN 104 may use carrier aggregation to allow the UE 102 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 104 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 102 or AN 108 may be or act as a roadside unit (RSU)
, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 104 may be an LTE RAN 110 with eNBs, for example, eNB 112. The LTE RAN 110 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 104 may be an NG-RAN 114 with gNBs, for example, gNB 116, or ng-eNBs, for example, ng-eNB 118. The gNB 116 may connect with 5G-enabled UEs using a 5G NR interface. The gNB 116 may connect with a 5G core through an NG interface, which may include an N2 interface or an N3 interface. The ng-eNB 118 may also connect with the 5G core through an NG interface, but may connect with a UE via an LTE air interface. The gNB 116 and the ng-eNB 118 may connect with each other over an Xn interface.

In some embodiments, the NG interface may be split into two parts, an NG user plane (NG-U) interface, which carries traffic data between the nodes of the NG-RAN 114 and a UPF 148 (e.g., N3 interface), and an NG control plane (NG-C) interface, which is a signaling interface between the nodes of the NG-RAN 114 and an AMF 144 (e.g., N2 interface).

The NG-RAN 114 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 102 can be configured with multiple BWPs where each BWP configuration has a different SCS. When a BWP change is indicated to the UE 102, the SCS of the transmission is changed as well. Another use case example of BWP is related to power saving. In particular, multiple BWPs can be configured for the UE 102 with different amount of frequency resources (for example, PRBs) to support data transmission under different traffic loading scenarios. A BWP containing a smaller number of PRBs can be used for data transmission with small traffic load while allowing power saving at the UE 102 and in some cases at the gNB 116. A BWP containing a larger number of PRBs can be used for scenarios with higher traffic load.

The RAN 104 is communicatively coupled to CN 120 that includes network elements to provide various functions to support data and telecommunications services to customers/subscribers (for example, users of UE 102). The components of the CN 120 may be implemented in one physical node or separate physical nodes. In some embodiments, NFV may be utilized to virtualize any or all of the functions provided by the network elements of the CN 120 onto physical compute/storage resources in servers, switches, etc. A logical instantiation of the CN 120 may be referred to as a network slice, and a logical instantiation of a portion of the CN 120 may be referred to as a network sub-slice.

In some embodiments, the CN 120 may be an LTE CN 122, which may also be referred to as an EPC. The LTE CN 122 may include MME 124, SGW 126, SGSN 128, HSS 130, PGW 132, and PCRF 134 coupled with one another over interfaces (or "reference points") as shown. Functions of the elements of the LTE CN 122 may be briefly introduced as follows.

The MME 124 may implement mobility management functions to track a current location of the UE 102 to facilitate paging, bearer activation/deactivation, handovers, gateway selection, authentication, etc.

The SGW 126 may terminate an S1 interface toward the RAN and route data packets between the RAN and the LTE CN 122. The SGW 126 may be a local mobility anchor point for inter-RAN node handovers and also may provide an anchor for inter-3GPP mobility. Other responsibilities may include lawful intercept, charging, and some policy enforcement.

The SGSN 128 may track a location of the UE 102 and perform security functions and access control. In addition, the SGSN 128 may perform inter-EPC node signaling for mobility between different RAT networks; PDN and S-GW selection as specified by MME 124; MME selection for handovers; etc. The S3 reference point between the MME 124 and the SGSN 128 may enable user and bearer information exchange for inter-3GPP access network mobility in idle/active states.

The HSS 130 may include a database for network users, including subscription-related information to support the network entities' handling of communication sessions. The HSS 130 can provide support for routing/roaming, authentication, authorization, naming/addressing resolution, location dependencies, etc. An S6a reference point between the HSS 130 and the MME 124 may enable transfer of subscription and authentication data for authenticating/authorizing user access to the LTE CN 120.

The PGW 132 may terminate an SGi interface toward a data network (DN) 136 that may include an application/content server 138. The PGW 132 may route data packets between the LTE CN 122 and the data network 136. The PGW 132 may be coupled with the SGW 126 by an S5 reference point to facilitate user plane tunneling and tunnel management. The PGW 132 may further include a node for policy enforcement and charging data collection (for example, PCEF). Additionally, the SGi reference point between the PGW 132 and the data network 1 36 may be an operator external public, a private PDN, or an intra-operator packet data network, for example, for provision of IMS services. The PGW 132 may be coupled with a PCRF 134 via a Gx reference point.

The PCRF 134 is the policy and charging control element of the LTE CN 122. The PCRF 134 may be communicatively coupled to the app/content server 138 to determine appropriate QoS and charging parameters for service flows. The PCRF 132 may provision associated rules into a PCEF (via Gx reference point) with appropriate TFT and QCI.

In some embodiments, the CN 120 may be a 5GC 140. The 5GC 140 may include an AUSF 142, AMF 144, SMF 146, UPF 148, NSSF 150, NEF 152, NRF 154, PCF 156, UDM 158, and AF 160 coupled with one another over interfaces (or "reference points") as shown. Functions of the elements of the 5GC 140 may be briefly introduced as follows.

The AUSF 142 may store data for authentication of UE 102 and handle authentication-related functionality. The AUSF 142 may facilitate a common authentication framework for various access types. In addition to communicating with other elements of the 5GC 140 over reference points as shown, the AUSF 142 may exhibit an Nausf service-based interface.

The AMF 144 may allow other functions of the 5GC 140 to communicate with the UE 102 and the RAN 104 and to subscribe to notifications about mobility events with respect to the UE 102. The AMF 144 may be responsible for registration management (for example, for registering UE 102), connection management, reachability management, mobility management, lawful interception of AMF-related events, and access authentication and authorization. The AMF 144 may provide transport for SM messages between the UE 102 and the SMF 146, and act as a transparent proxy for routing SM messages. AMF 144 may also provide transport for SMS messages between UE 102 and an SMSF. AMF 144 may interact with the AUSF 142 and the UE 102 to perform various security anchor and context management functions. Furthermore, AMF 144 may be a termination point of a RAN CP interface, which may include or be an N2 reference point between the RAN 104 and the AMF 144; and the AMF 144 may be a termination point of NAS (N1) signaling, and perform NAS ciphering and integrity protection. AMF 144 may also support NAS signaling with the UE 102 over an N3 IWF interface.

The SMF 146 may be responsible for SM (for example, session establishment, tunnel management between UPF 148 and AN 108); UE IP address allocation and management (including optional authorization); selection and control of UP function; configuring traffic steering at UPF 148 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 144 over N2 to AN 108; and determining SSC mode of a session. SM may refer to management of a PDU session, and a PDU session or "session" may refer to a PDU connectivity service that provides or enables the exchange of PDUs between the UE 102 and the data network 136.

The UPF 148 may act as an anchor point for intra-RAT and inter-RAT mobility, an external PDU session point of interconnect to data network 136, and a branching point to support multi-homed PDU session. The UPF 148 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 148 may include an uplink classifier to support routing traffic flows to a data network.

The NSSF 150 may select a set of network slice instances serving the UE 102. The NSSF 150 may also determine allowed NSSAI and the mapping to the subscribed S-NS-SAIs, if needed. The NSSF 150 may also determine the AMF set to be used to serve the UE 102, or a list of candidate AMFs based on a suitable configuration and possibly by querying the NRF 154. The selection of a set of network slice instances for the UE 102 may be triggered by the AMF 144 with which the UE 102 is registered by interacting with the NSSF 150, which may lead to a change of AMF. The NSSF 150 may interact with the AMF 144 via an N22 reference point; and may communicate with another NSSF in a visited network via an N31 reference point (not shown). Additionally, the NSSF 150 may exhibit an Nnssf service-based interface.

The NEF 152 may securely expose services and capabilities provided by 3GPP network functions for third party, internal exposure/re-exposure, AFs (e.g., AF 160), edge computing or fog computing systems, etc. In such embodiments, the NEF 152 may authenticate, authorize, or throttle the AFs. NEF 152 may also translate information exchanged with the AF 160 and information exchanged with internal network functions. For example, the NEF 152 may translate between an AF-Service-Identifier and an internal 5GC information. NEF 152 may also receive information from other NFs based on exposed capabilities of other NFs. This information may be stored at the NEF 152 as structured data, or at a data storage NF using standardized interfaces. The stored information can then be re-exposed by the NEF 152 to other NFs and AFs, or used for other purposes such as analytics. Additionally, the NEF 152 may exhibit an Nnef service-based interface.

The NRF 154 may support service discovery functions, receive NF discovery requests from NF instances, and provide the information of the discovered NF instances to the NF instances. NRF 154 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 154 may exhibit the Nnrf service-based interface.

The PCF 156 may provide policy rules to control plane functions to enforce them, and may also support unified policy framework to govern network behavior. The PCF 156 may also implement a front end to access subscription information relevant for policy decisions in a UDR of the UDM 158. In addition to communicating with functions over reference points as shown, the PCF 156 exhibit an Npcf service-based interface.

The UDM 158 may handle subscription-related information to support the network entities' handling of communication sessions, and may store subscription data of UE 102. For example, subscription data may be communicated via an N8 reference point between the UDM 158 and the AMF 144. The UDM 158 may include two parts, an application front end and a UDR. The UDR may store subscription data and policy data for the UDM 158 and the PCF 156, and/or structured data for exposure and application data (including PFDs for application detection, application request information for multiple UEs 102) for the NEF 152. The Nudr service-based interface may be exhibited by the UDR 221 to allow the UDM 158, PCF 156, and NEF 152 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 158 may exhibit the Nudm service-based interface.

The AF 160 may provide application influence on traffic routing, provide access to NEF, and interact with the policy framework for policy control.

In some embodiments, the 5GC 140 may enable edge computing by selecting operator/3rd party services to be geographically close to a point that the UE 102 is attached to the network. This may reduce latency and load on the network. To provide edge-computing implementations, the 5GC 140 may select a UPF 148 close to the UE 102 and execute traffic steering from the UPF 148 to data network 136 via the N6 interface. This may be based on the UE subscription data, UE location, and information provided by the AF 160. In this way, the AF 160 may influence UPF (re)selection and traffic routing. Based on operator deployment, when AF 160 is considered to be a trusted entity, the network operator may permit AF 160 to interact directly with relevant NFs. Additionally, the AF 160 may exhibit an Naf service-based interface.

The data network 136 may represent various network operator services, Internet access, or third party services that may be provided by one or more servers including, for example, application/content server 138.

A gNB, such as gNB 116, may be disaggregated, and include a gNB-Central Unit (gNB-CU) and one or more gNB Distributed Unit(s) (gNB-DU(s)). A gNB-CU and a gNB-DU are connected via F1 interface. NG, Xn and F1 are logical interfaces. For NG-RAN, the NG and Xn-Control (Xn-C) interfaces for a gNB including a gNB-CU and gNB-DUs terminate in the gNB-CU. For EN-DC, the S1-U (S1-User plane) and X2-C(X2-Control plane) interfaces for a gNB including a gNB-CU and gNB-DUs terminate in the gNB-CU. The gNB-CU and connected gNB-DUs are only visible as a gNB to other gNBs and to the 5GC.

To address the issue of explosive increases of the bandwidth required for the transport between the gNB-CU and gNB-DU by the introduction of massive multiple-input multiple output (MIMO) and extending the frequency bandwidth using Cloud RAN (C-RAN) deployment, the functional split between gNB-CU and gNB-DU within gNB and the corresponding open interface between these nodes has been defined. Specifically, a functional split has been adopted where the PDCP layer and above can be located in the gNB-CU, and the RLC layer and below can be located in the gNB-DU. The standard interface between them is specified as F1.

3GPP standardization has defined an open interface between the control-plane (C-plane) termination parts and user-plane (U-plane) termination parts of gNB-CU so that the functional separation between the two can be achieved even between different vendors. A node that terminates the C-plane of gNB-CU is called gNB-CU-CP, and a node that terminates the U-plane of the gNB-CU is called gNB-CU-UP. The standard interface between these nodes is specified as E1.

F1-C refers to the standard interface between the gNB-DU and a control plane of the gNB-CU, and F1-U refers to the standard interface between the gNB-DU and a user plane of the gNB-CU.

A gNB-CU refers to a logical node hosting radio resource control (RRC), Service Data Adaptation Protocol (SDAP) and PDCP protocols of the gNB or RRC, and PDCP protocols of the en-gNB, and controls the operation of one or more gNB-DUs.

A gNB-DU refers to a logical node hosting RLC, medium access control (MAC) and physical (PHY) layers of the gNB or en-gNB, and its operation is partly controlled by gNB-CU. One gNB-DU supports one or multiple cells. One cell is supported by only one gNB-DU. The gNB-DU terminates the F1 interface connected with the gNB-CU. A gNB-CU-Control Plane (gNB-CU-CP) is a logical node hosting the RRC and the control plane part of the PDCP protocol of the gNB-CU for an en-gNB or a gNB. The gNB-CU-CP terminates the E1 interface connected with the gNB-CU-UP and the F1-C interface connected with the gNB-DU. A gNB-CU-User Plane (gNB-CU-UP) is a logical node hosting the user plane part of the PDCP protocol of the gNB-CU for an en-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU.

Figure 2:
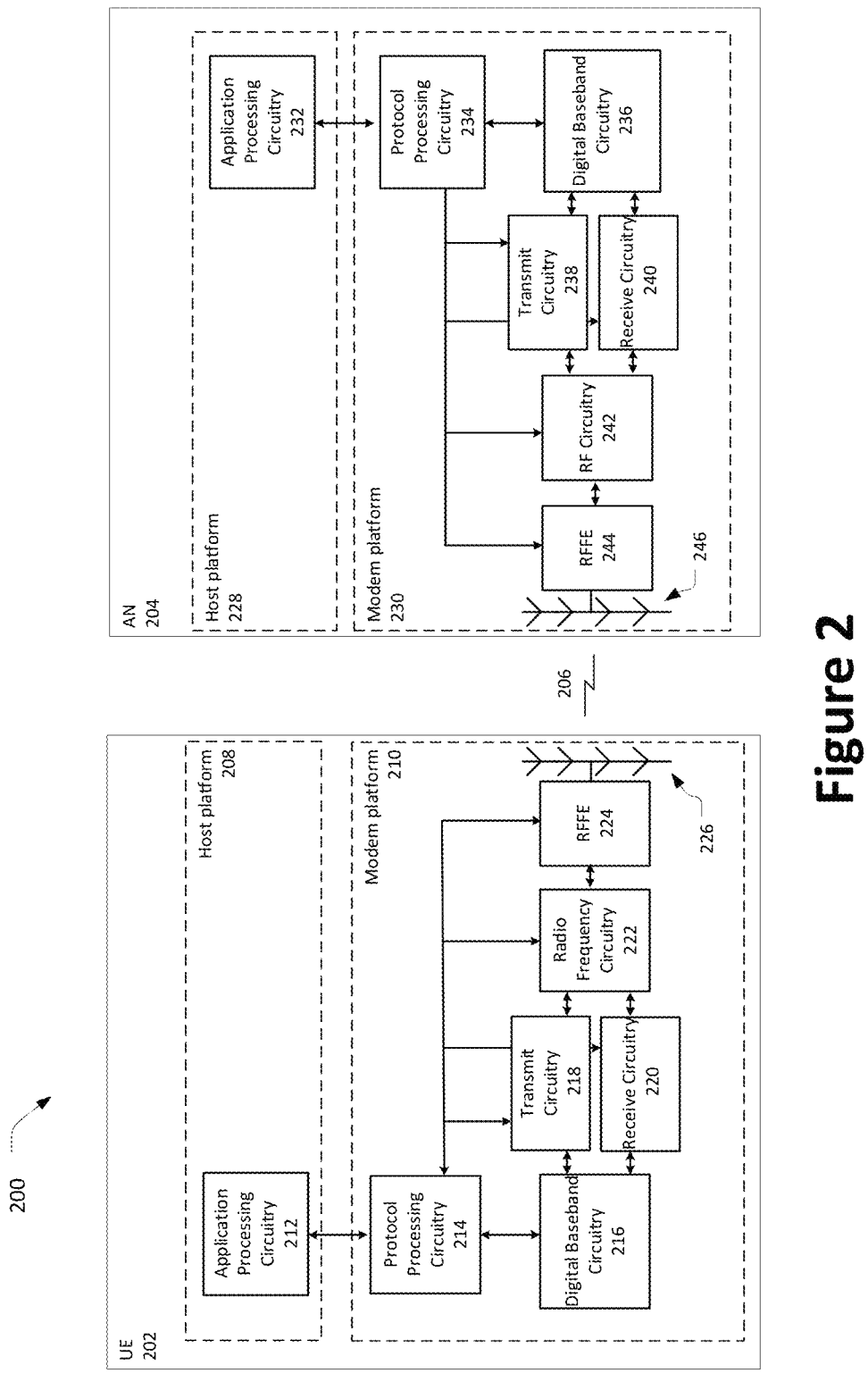
FIG. 2 shows a cellular wireless network between a UE and an access node (AN) according to some embodiments.

FIG. 2 schematically illustrates a cellular wireless network 200 in accordance with various embodiments. The wireless network 200 may include a UE 202 in wireless communication with an AN 204. The UE 202 and AN 204 may be similar to, and substantially interchangeable with, like-named components described elsewhere herein.

The UE 202 may be communicatively coupled with the AN 204 via connection 206. The connection 206 is illustrated as an air interface to enable communicative coupling, and can be consistent with cellular communications protocols such as an LTE protocol or a 5G NR protocol operating at mmWave or sub-6 GHz frequencies.

The UE 202 may include a host platform 208 coupled with a modem platform 210. The host platform 208 may include application processing circuitry 212, which may be coupled with protocol processing circuitry 214 of the modem platform 210. The application processing circuitry 212 may run various applications for the UE 202 that source/sink application data. The application processing circuitry 212 may further implement one or more layer operations to transmit/receive application data to/from a data network. These layer operations may include transport (for example UDP) and Internet (for example, IP) operations The protocol processing circuitry 214 may implement one or more of layer operations to facilitate transmission or reception of data over the connection 206. The layer operations implemented by the protocol processing circuitry 214 may include, for example, MAC, RLC, PDCP, RRC and NAS operations.

The modem platform 210 may further include digital baseband circuitry 216 that may implement one or more layer operations that are "below" layer operations performed by the protocol processing circuitry 214 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 210 may further include transmit circuitry 218, receive circuitry 220, RF circuitry 222, and RF front end (RFFE) 224, which may include or connect to one or more antenna panels 226. Briefly, the transmit circuitry 218 may include a digital-to-analog converter, mixer, intermediate frequency (IF) components, etc.; the receive circuitry 220 may include an analog-to-digital converter, mixer, IF components, etc.; the RF circuitry 222 may include a low-noise amplifier, a power amplifier, power tracking components, etc.; RFFE 224 may include filters (for example, surface/bulk acoustic wave filters), switches, antenna tuners, beamforming components (for example, phase-array antenna components), etc. The selection and arrangement of the components of the transmit circuitry 218, receive circuitry 220, RF circuitry 222, RFFE 224, and antenna panels 226 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 214 may include one or more instances of control circuitry (not shown) to provide control functions for the transmit/receive components.

A UE reception may be established by and via the antenna panels 226, RFFE 224, RF circuitry 222, receive circuitry 220, digital baseband circuitry 216, and protocol processing circuitry 214. In some embodiments, the antenna panels 226 may receive a transmission from the AN 204 by receive-beamforming signals received by a plurality of antennas/antenna elements of the one or more antenna panels 226.

A UE transmission may be established by and via the protocol processing circuitry 214, digital baseband circuitry 216, transmit circuitry 218, RF circuitry 222, RFFE 224, and antenna panels 226. In some embodiments, the transmit components of the UE 204 may apply a spatial filter to the data to be transmitted to form a transmit beam emitted by the antenna elements of the antenna panels 226.

Similar to the UE 202, the AN 204 may include a host platform 228 coupled with a modem platform 230. The host platform 228 may include application processing circuitry 232 coupled with protocol processing circuitry 234 of the modem platform 230. The modem platform may further include digital baseband circuitry 236, transmit circuitry 238, receive circuitry 240, RF circuitry 242, RFFE circuitry 244, and antenna panels 246. The components of the AN 204 may be similar to and substantially interchangeable with like-named components of the UE 202. In addition to performing data transmission/reception as described above, the components of the AN 208 may perform various logical functions that include, for example, RNC functions such as radio bearer management, uplink and downlink dynamic radio resource management, and data packet scheduling.

Figure 3:
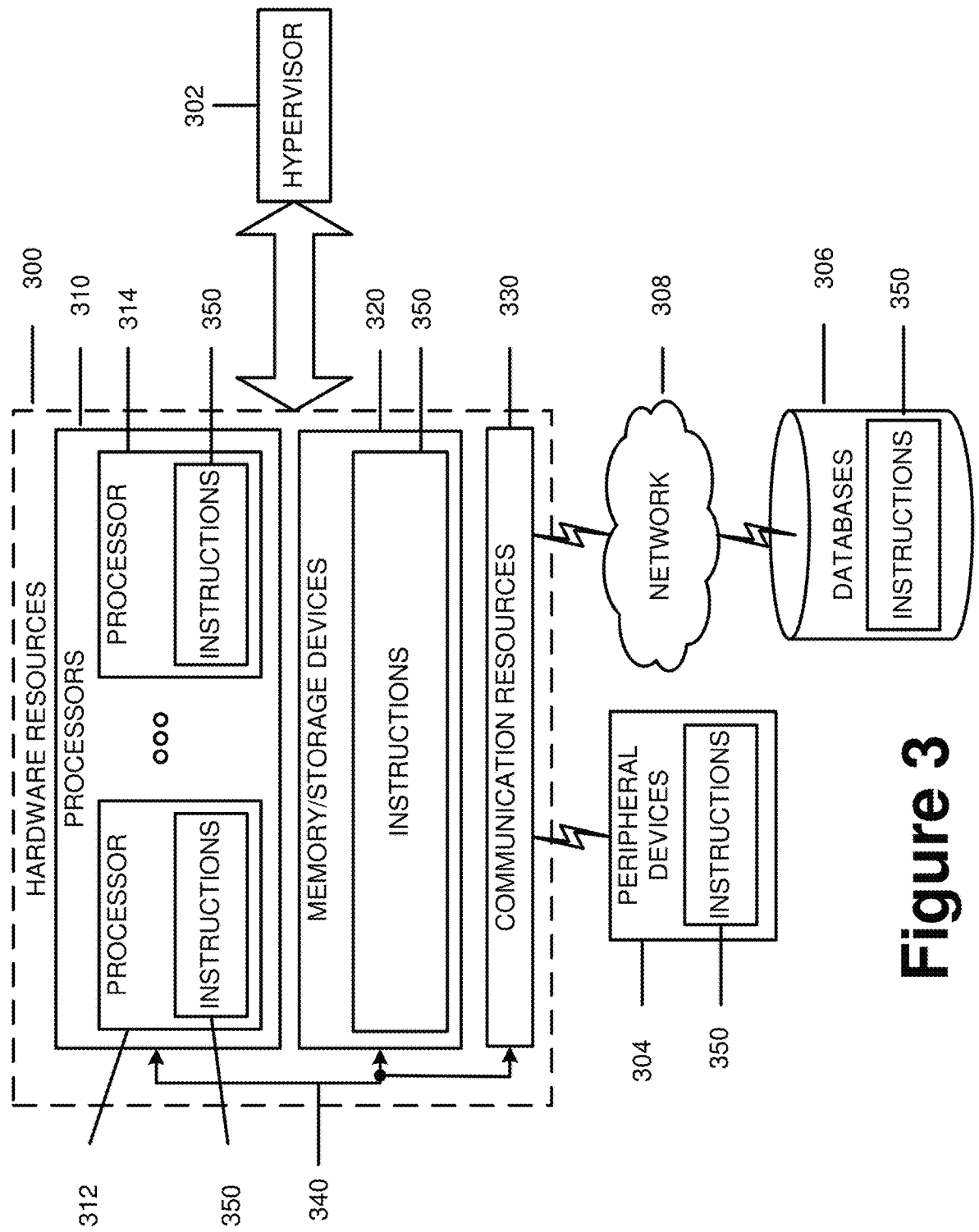
FIG. 3 shows components, according to some example embodiments, able to read instructions from a machine-readable or computer-readable medium.

FIG. 3 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 3 shows a diagrammatic representation of hardware resources 300 including one or more processors (or processor cores) 310, one or more memory/storage devices 320, and one or more communication resources 330, each of which may be communicatively coupled via a bus 340 or other interface circuitry. For embodiments where node virtualization (e.g., NFV) is utilized, a hypervisor 302 may be executed to provide an execution environment for one or more network slices/sub-slices to utilize the hardware resources 300.

The processors 310 may include, for example, a processor 312 and a processor 314. The processors 310 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 320 may include main memory, disk storage, or any suitable combination thereof. The memory/storage devices 320 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 330 may include interconnection or network interface controllers, components, or other suitable devices to communicate with one or more peripheral devices 304 or one or more databases 306 or other network elements via a network 308. For example, the communication resources 330 may include wired communication components (e.g., for coupling via USB, Ethernet, etc.), cellular communication components, NFC components, Bluetooth® (or Bluetooth® Low Energy) components, Wi-Fi® components, and other communication components.

Instructions 350 may comprise software, a program, an application, an applet, an app, or other executable code for causing at least any of the processors 310 to perform any one or more of the methodologies discussed herein. The instructions 350 may reside, completely or partially, within at least one of the processors 310 (e.g., within the processor's cache memory), the memory/storage devices 320, or any suitable combination thereof. Furthermore, any portion of the instructions 350 may be transferred to the hardware resources 300 from any combination of the peripheral devices 304 or the databases 306. Accordingly, the memory of processors 310, the memory/storage devices 320, the peripheral devices 304, and the databases 306 are examples of computer-readable and machine-readable media.

As noted previously, mechanisms are needed to ensure that 5QI information, including a 5QI value and its associated characteristics, be configured between network nodes or components of a 5G network in order to ensure that the configured nodes can understand each other with respect to QoS requirements for a given service/QoS flow.

According to some embodiments, 5QI information may be configured to ANs by way of an interaction between a management plane a control plane to configure network nodes (e.g. ANs, RANs, etc.) with 5QI information to ensure that the 5G network is running as expected.

According to some embodiments, a service producer (such as, for example, the provider of the management system, which, in some instances, may also correspond to a vendor of the network components, such as ANs and/or CN), may provide a management service to a service consumer to allow the service consumer to configure 5QI information to the network nodes, such as ANs. Embodiments aim in part to resolve a problem of configuring 5QI information to a network by way of a management service. In particular, according to some embodiments, a network operator, having for example acquired the network components from the management producer, may correspond to the service consumer. According to some embodiments, the service producer may allow the service consumer to configure 5QI information, including one or more 5QI values and their corresponding characteristics, to the 5G network, such as to ANs. According to some embodiments, a service producer may provide to a service consumer the capability of allowing the service consumer, such as a network operator, to configure 5QI information to network nodes of a 5G network. The service consumer could provide the 5QI information to the service producer via a vendor management system interface, as will be described in further detail below. The service producer, such as the network operator, would then be configured to a specific 5QI configuration, including one or more 5QI values and associated characteristics. The service consumer may decide which 5QI information may correspond to which service.

The 5QI information according to some embodiments may need to be configured to both ANs and to the SMF within the CN of the network. The core and RANs may be configured with the same 5QI information so that they can understand each other when a same integer value corresponding to the 5QI value is used to determine QoS characteristics for communication within the network. All of SMF within CN, and gNB CU-CP and gNB CU-UP are expected to be configured with the same 5QI information.

Some embodiments herein concern 5QI configuration in the interface between a management system as part of a service producer on the one hand, and a management consumer, such as a network operator. According to some other embodiments, configuration of an AN with 5QI information may optionally be performed in the same standardized manner as is described herein for the interface between a vendor and a network operator, using the details to be provided below for such configuration, and, in such a case, the ANs may, according to one example, be service producer, and the management system would serve as the service consumer providing the 5QI configuration to the ANs. According to some alternative embodiments, one or more ANs may already have management capabilities embedded therein, and may service as service producers. According to some other embodiments, configuration of an AN with 5QI information may optionally be performed in another proprietary manner.

According to some embodiments, the service consumer may configure the service producer with 5QI information at a launch of the network, and, by way of example, at least for a new/added service to be supported by the service consumer, for a new/added network node, such as AN, and/or for adjustment of QoS characteristics of existing services.

5QI information may be communicated to the UEs of a 5G network, instead of through a management system/a service producer, through a network communication with the UEs, through the network, such as through the ANs. One or more UEs may further be configured with the 5QI information by their manufacturers at the time of manufacture.

In a 5G system architecture, such as the one shown and described in the context of FIG. 1, the QoS Flow is characterized by a QoS profile provided by Session Management Function (SMF) 246 to an AN of the network, such as RAN 214, via AMF 244 and over the N2 reference point or interface, or, the QoS profile may be preconfigured in the AN. In the case of pre-configuration, the pre-configured 5G QoS characteristics are indicated through a 5QI value, and are not signaled on any interface, unless certain 5G QoS characteristics are modified.

In a 5G core network (5GC) user data QoS control, the SMF maps the 5QI to differentiated services code point (DSCP), and provides the mapped DSCP to UPF when establishing the QoS flow. The mapping of 5QIs and DSCPs are needed by OAM to monitor the performance of GTP tunnel, so OAM may need to configure the mapping in some cases, for instance for the non-standardized 5QIs.

The solutions supporting the configuration of 5QIs and management of 5QI to DSCP mapping are needed but currently missing.

Various embodiments, herein provide methods and systems for 5QI management, including the 5QI configuration and 5QI to DSCP mapping.

The instant disclosure provides industry solutions for 5QI management, including the 5QI configuration and 5QI to DSCP mapping.

In particular, some embodiments define the following information object class (IOC) and dataTypes in 3GPP TS 28.541 for 5QI configuration:

5.3.x Configurable5QISet 5.3.x.1 Definition

This IOC specifies the non-standardized 5QIs, including their QoS characteristics, that need to be pre-configured (and configurable) to the 5G NFs, see 3GPP TS 23.501 [2].

5.3.x.2 Attributes

| Attribute name | Support Qualifier | isReadable | isWritable | isInvariant | isNotifyable |
|---|---|---|---|---|---|
| configurable5QIs | M | T | T | F | T |

5.3.x.3 Attribute constraints

None.

5.3.x.4 Notifications

The common notifications defined in subclause 5.5 are valid for this IOC, without exceptions or additions.

5.3.y 5QICharacteristics 5.3.y.1 Definition

This specifies the 5QI value and the corresponding QoS characteristics for a configurable 5QI.

5.3.y.2 Attributes

| Attribute name | Support Qualifier | isReadable | isWritable | isInvariant | isNotifyable |
|---|---|---|---|---|---|
| 5QIValue | M | T | T | F | T |
| resourceType | M | T | T | F | T |
| priorityLevel | M | T | T | F | T |
| packetDelayBudget | M | T | T | F | T |
| packetErrorRate | M | T | T | F | T |
| averagingWindow | M | T | T | F | T |
| maximumDataBurstVolume | M | T | T | F | T |

5.3.y.3 Attribute constraints

None 5.3.y.4 Notifications

The subclause 4.5 of the <<IOC>> using the 5QICharacteristics as one of its attributes, shall be applicable.

5.3.z PacketErrorRate <<dataType>>

5.3.z.1 Definition

This data type specifies the Packet Error Rate of a configurable 5QI.

5.3.z.2 Attributes

| Attribute name | Support Qualifier | isReadable | isWritable | isInvariant | isNotifyable |
|---|---|---|---|---|---|
| Scalar | M | T | T | F | T |
| exponent | M | T | T | F | T |

5.3.z.3 Attribute constraints

None 5.3.z.4 Notifications

The subclause 4.5 of the <<IOC>> using this <<dataType>> as one of its attributes, shall be applicable.

Figure 4:
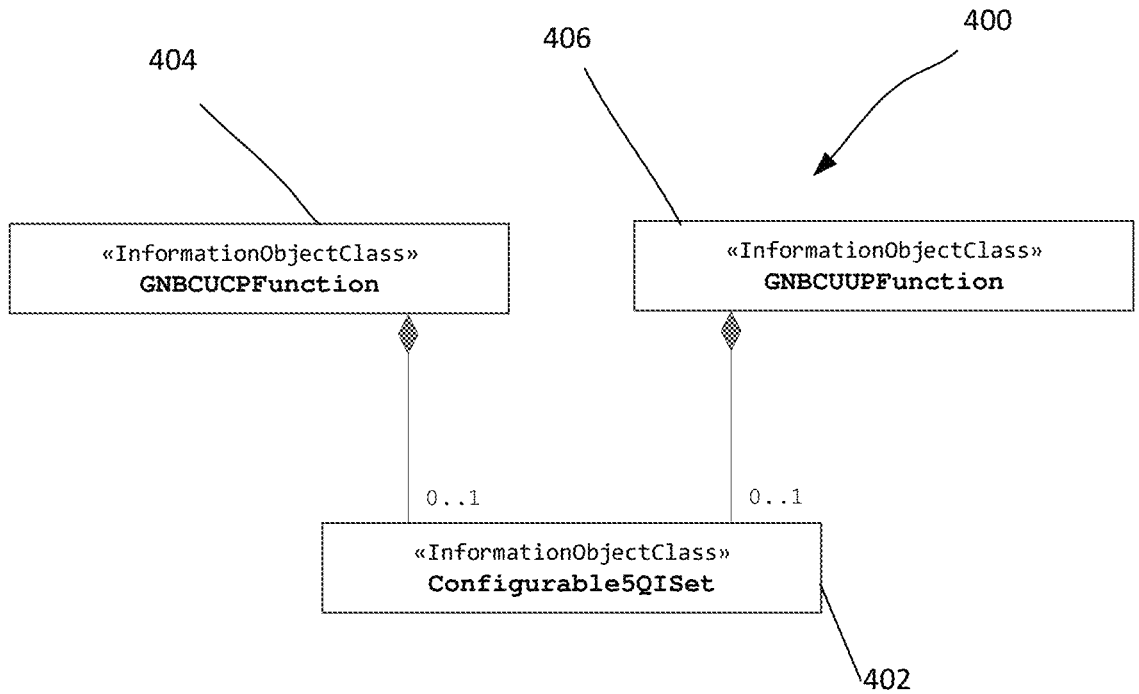
FIG. 4 shows a network resource model (NRM) fragment for configurable 5QIs in NG-RAN according to one embodiment.

FIG. 4 shows a network resource model (NRM) fragment 400 for configurable 5QIs in NG-RAN. In FIG. 4, 5QI information, in the form of a Configurable5QISet 402 as part of an IOC, with each set including, for example, information regarding a given 5QI value and its associated characteristics, may be communicated by a management service consumer of each AN within the network (such as gNB-CU-CP 404 and gNB-CU-UP 406 functions of the gNB corresponding to each AN) to a management service producer. The service producer may be a management system or the gNB-CU-CP 404 and gNB-CU-UP 406 function.

Figure 5:
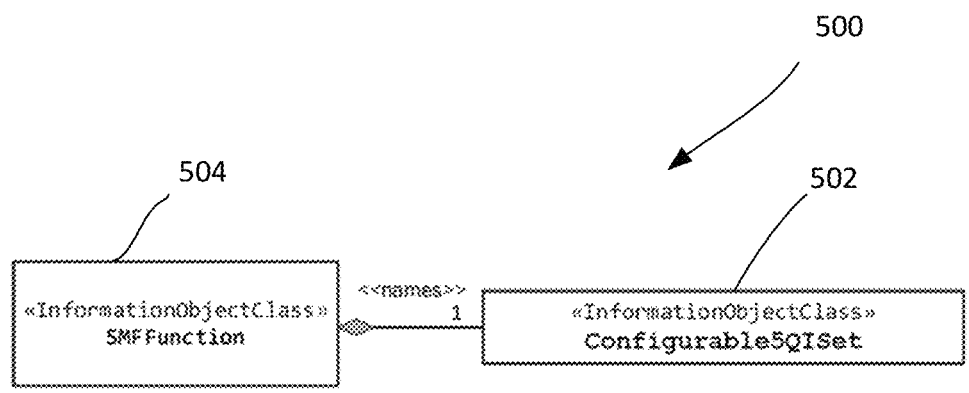
FIG. 5 shows a NRM fragment for configurable 5QIs in the 5G Core Network or 5GC.

FIG. 5 shows NRM fragment 500 for configurable 5QIs in the 5G CN or 5GC. In FIG. 5, 5QI information, in the form of a Configurable5QISet 502 as part of an IOC, with each set including, for example, information regarding a given 5QI value and its associated characteristics, may be communicated by a management service consumer of the SMF 504 of the 5GC to a management service producer. The service producer may be a management system or the SMF 504.

Figure 6:
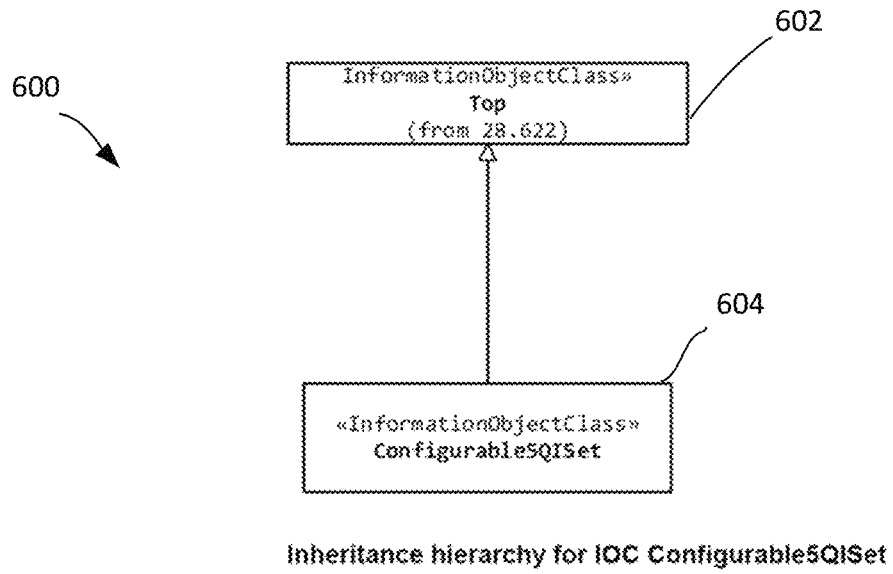
FIG. 6 shows an inheritance hierarchy from an information object class (IOC) under 3GPP TS 28.622 of a Configurable5QISet IOC according to one embodiment.

FIG. 6 shows the inheritance hierarchy 600 from Top IOC 602 under 3GPP TS 28.622 of a Configurable5QISet IOC 604 which is hierarchically inherited from IOC 602.

Attribute properties in some IOCs, such as those disclosed herein, are further as follows:

5.3.a Attribute properties

The following table defines the attributes that are present in several Information Object Classes (IOCs) for configurable5Qis of the present document.

| Attribute Name | Documentation and Allowed Values | Properties |
|---|---|---|
| configurable5QIs | It indicates the configurable 5QIs, including their QoS characteristics. allowedValues: N/A | type: 5QICharacteristics multiplicity: * isOrdered: N/A isUnique: N/A defaultValue: None isNullable: False |

-continued

| Attribute Name | Documentation and Allowed Values | Properties |
|---|---|---|
| 5QIValue | It identifies the 5QI value. allowedValues: 0-255 | type: Integer multiplicity: 1 isOrdered: N/A isUnique: Yes defaultValue: None isNullable: False |
| resourceType | It indicates the Resource Type of a 5QI, as specified in TS 23.501 [2]. allowedValues: "GBR", "Non-GBR" | type: ENUM multiplicity: 1 isOrdered: N/A isUnique: False defaultValue: None isNullable: False |
| priorityLevel | It indicates the Priority Level of a 5QI, as specified in TS 23.501 [2]. allowedValues: 0-127 | type: Integer multiplicity: 1 isOrdered: N/A isUnique: False defaultValue: None isNullable: False |
| packetDelayBudget | It indicates the Packet Delay Budget (in unit of 0.5 ms) of a 5QI, as specified in TS 23.501 [2]. allowedValues: 0-1023 | type: Integer multiplicity: 1 isOrdered: N/A isUnique: False defaultValue: None isNullable: False |
| packetErrorRate | It indicates the Packet Error Rate of a 5QI, as specified in TS 23.501 [2]. allowedValues: N/A | type: PacketErrorRate multiplicity: 1 isOrdered: N/A isUnique: False defaultValue: None isNullable: False |
| averagingWindow | It indicates the Averaging Window (in unit of ms) of a 5QI, as specified in TS 23.501 [2]. allowedValues: 0-4095 | type: Integer multiplicity: 1 isOrdered: N/A isUnique: False defaultValue: None isNullable: False |
| maximumDataBurstVolume | It indicates the Maximum Data Burst Volume (in unit of Byte) of a 5QI, as specified in TS 23.501 [2]. allowedValues: 0-4095 | type: Integer multiplicity: 1 isOrdered: N/A isUnique: False defaultValue: None isNullable: False |
| scalar | The Packet Error Rate of a 5QI expressed as Scalar x 10-k where k is the Exponent. This attriutes indicates the Scalar of this expression. allowedValues: 0-9 | type: Integer multiplicity: 1 isOrdered: N/A isUnique: False defaultValue: None isNullable: False |
| exponent | The Packet Error Rate of a 5QI expressed as Scalar x 10-k where k is the Exponent. This attriutes indicates the Exponent of this expression. allowedValues: 0-9 | type: Integer multiplicity: 1 isOrdered: N/A isUnique: False defaultValue: None isNullable: False |

Some embodiments as disclosed herein pertain to the following IOC and dataTypes in TS 28.541 for management of 5QI and DSCP mapping:

5.3.p 5qiDscpMappingSet 5.3.x.1 Definition

This IOC specifies the set of mapping between 5QIs and DSCP.

5.3.p.2 Attributes

| Attribute name | Support Qualifier | isReadable | isWritable | isInvariant | isNotifyable |
|---|---|---|---|---|---|
| 5qiDscpMappingList | M | T | T | F | T |

5.3.p.3 Attribute constraints

None.

5.3.p.4 Notifications

The common notifications defined in subclause 5.5 are valid for this IOC, without exceptions or additions.

5.3.q 5qiDscpMapping <<dataType>>

5.3.q.1 Definition

This data type specifies the mapping between 5QIs to DSCP.

5.3.q.2 Attributes

| Attribute name | Support Qualifier | isReadable | isWritable | isInvariant | isNotifyable |
|---|---|---|---|---|---|
| 5QIValues | M | T | T | F | T |
| dscp | M | T | T | F | T |

5.3.q.3 Attribute constraints

None 5.3.q.4 Notifications

The subclause 4.5 of the <<IOC>> using this <<dataType>> as one of its attributes, shall be applicable.

Figure 7:
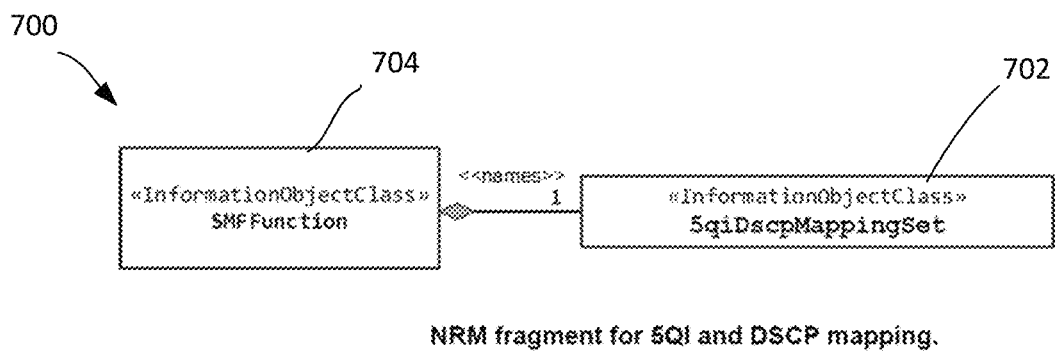
FIG. 7 shows the NRM fragment for 5QI and differentiated services code point (DSCP) mapping.

FIG. 7 shows the NRM fragment 700 for 5QI and DSCP mapping. In FIG. 7, 5QI information, in the form of a 5QIDscpMappingSet 702 as part of an IOC, with each set including, for example, information regarding one or more 5QI value and a DSCP value that the 5QI(s) are mapped to, may be communicated by a management service consumer of the SMF 704 of a 5GC to a management service producer. The service producer may be a management system or the SMF 704.

Figure 8:
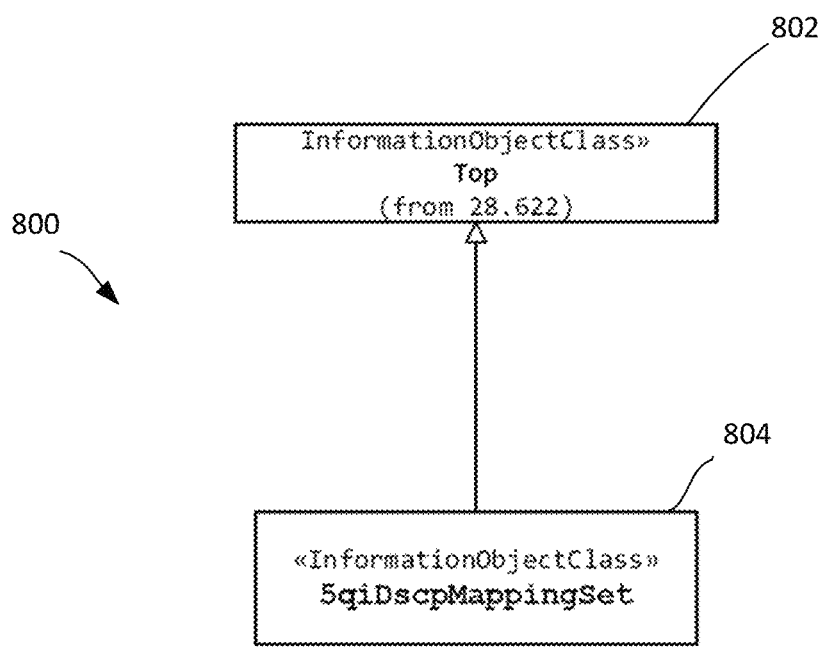
FIG. 8 shows an inheritance hierarchy for an IOC EP-RP related to the 5GC NF NRM under 3GPP TS 28.622 for a 5QIDscpMappingSet.

FIG. 8 shows the inheritance hierarchy 800 for an Top IOC 802 under 3GPP TS 28.622 for a 5QIDscpMappingSet IOC 804 which is hierarchically inherited from IOC 802.

Attribute properties in some IOCs for 5QIDSCPMappingList, such as those disclosed herein, are further as follows:

5.3.b Attribute properties

The following table defines the attributes that are present in several Information Object Classes (IOCs) of the present document.

| Attribute Name | Documentation and Allowed Values | Properties |
|---|---|---|
| 5qiDscpMappingList | It provides the list of mapping between 5QIs and DSCP. allowedValues: N/A | type: 5qiDscpMapping multiplicity: * isOrdered: N/A |

-continued

| Attribute Name | Documentation and Allowed Values | Properties |
|---|---|---|
| | | isUnique: N/A<br>defaultValue: None<br>isNullable: False |
| 5QIValues | It indicates a list of 5QI value.<br>allowedValues: 0-255 | type: Integer<br>multiplicity: *<br>isOrdered: N/A<br>isUnique: Yes<br>defaultValue: None<br>isNullable: False |
| dscp | It indicates a DSCP.<br>allowedValues: 0-255 | type: Integer<br>multiplicity: 1<br>isOrdered: N/A<br>isUnique: Yes<br>defaultValue: None<br>isNullable: False |

EXAMPLE PROCEDURES

Figure 9:
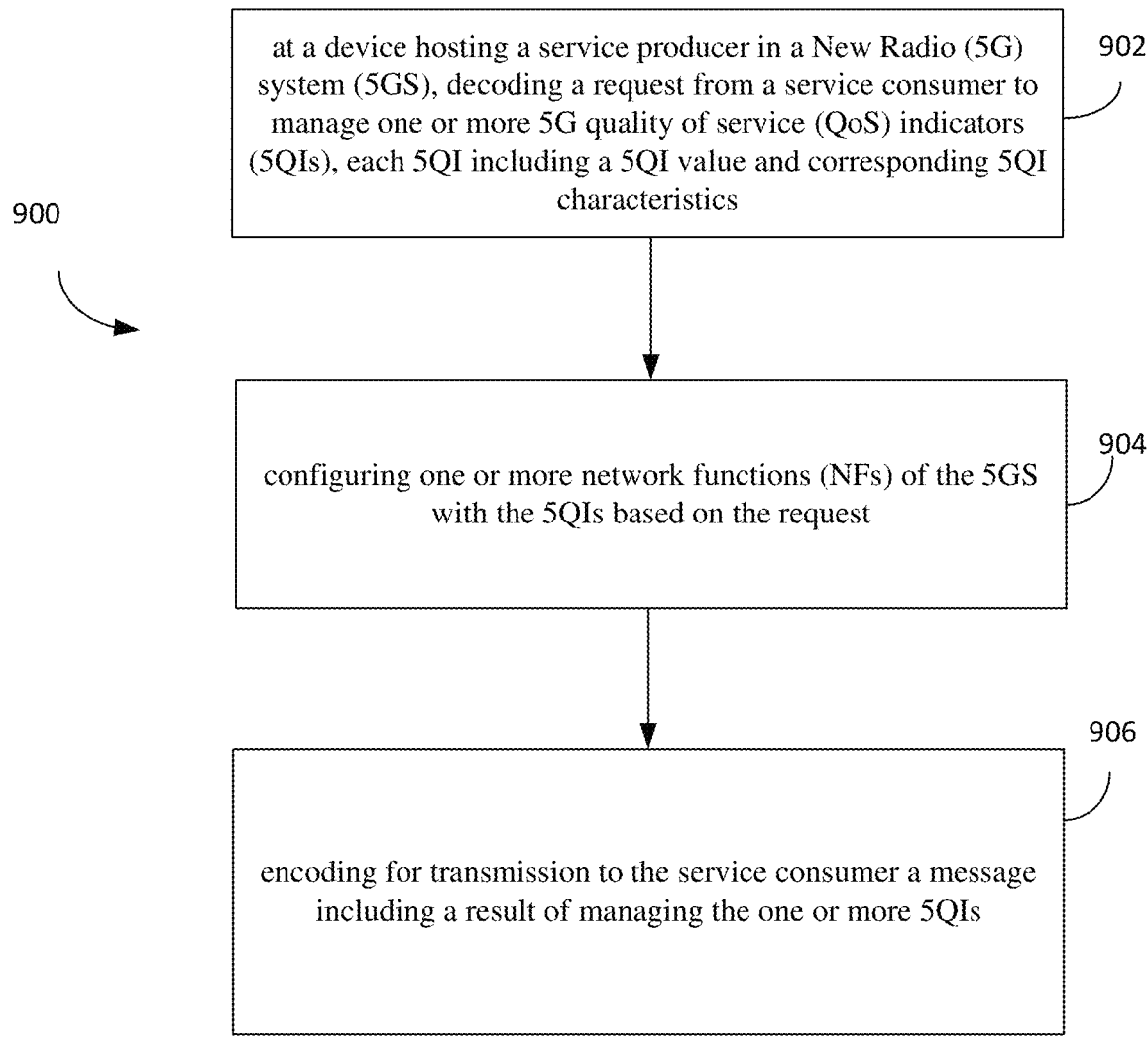
FIG. 9 shows a process to be performed at a service producer according to an embodiment.

In some embodiments, the electronic device(s), network(s), system(s), chip(s) or component(s), or portions or implementations thereof, of FIGS. 1-3, or some other figure herein, may be configured to perform one or more processes, techniques, or methods as described herein, or portions thereof. One such process is depicted in FIG. 9. In some embodiments, the process of FIG. 9 may be performed by a service producer of a wireless cellular network.

Referring to FIG. 9, a process 900 to be performed at a device hosting a service producer in a 5GS may include: at operation 902 decoding a request from a service consumer to manage one or more 5G quality of service (QoS) indicators (5QIs), each 5QI including a 5QI value and corresponding 5QI characteristics; at operation 904, configuring one or more network functions (NFs) of the 5GS with the 5QIs based on the request; and at operation 906, encoding for transmission to the service consumer a message including a result of managing the one or more 5QIs.

For example, another process may include receiving from a consumer device, a request to configure a 5G quality of service (QoS) indicator (5QI). Alternatively, or additionally, the request may be a request for information associated with a previously configured 5QI. The process may further include encoding, for transmission to one or more network functions (NFs), one or more configuration messages to configure the 5QI based on the request. Alternatively, the process may include transmitting a request to retrieve information associated with a previously configured 5QI.

In some embodiments, the process may further include encoding, for transmission to the consumer device, configuration information associated with the 5QI. In some embodiments, the configuration information may include mapping information to map the 5QI to a DSCP.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

EXAMPLES

Some examples of embodiments are provided below.

Example 1 includes a device to host a service producer in a New Radio (5G) system (5GS), the device comprising: a memory to store instructions; and one or more processors coupled to the memory to execute the instructions to: decode a request from a service consumer to manage one or more 5G quality of service (QoS) indicators (5QIs), each 5QI including a 5QI value and corresponding 5QI characteristics; configure one or more network functions (NFs) of the 5GS with the 5QIs based on the request; and encode for transmission to the service consumer a message including a result of managing the one or more 5QIs.

Example 2 includes the subject matter of Example 1, wherein the request includes a request to one of configure the 5QIs or to obtain the 5QIs.

Example 3 includes the subject matter of Example 1, wherein the one or more NFs include a session management function (SMF) of a 5G core network (5GC) of the 5GS, and/or a 5G Node B (gNB) central unit (CU) control plane (CP) (gNB CU-CP) and/or a gNB CU user plane (gNB-CU-UP).

Example 4 includes the subject matter of Example 1, wherein the request includes a request to at least one of configure a mapping of the 5QIs to a differentiated services code point (DSCP), or obtain a mapping of the 5QIs to DSCP, the one or more processors further to cause, in response to the request, at least one of a mapping of the 5QIs to DSCP or a transmission to the service consumer of the mapping of the 5QIs to the DSCP.

Example 5 includes the subject matter of any one of Examples 1-4, wherein the characteristics include at least one of a resource type, a priority level, a packet delay budget, a packet error rate, or an averaging window.

Example 6 includes the subject matter of Example 5, wherein the packet error rate corresponds to an attribute name of scalar or exponent, and is readable, no invariant, and notifiable, and that is further either writable or not writable.

Example 7 includes the subject matter of any one of Examples 1-6, wherein the one or more processors are to process messages including information regarding the 5QIs using managed object instances (MOIs) of an information object class (IOC) corresponding to the 5QIs.

Example 8 includes the subject matter of Example 7, wherein, when the one or more NFs include the SMF, or the gNB-CU-CP and/or the gNB-CU-UP, the IOC corresponds to a Configurable5QIset having an attribute name Configurable5QIs that is readable, writable, configurable and notifiable.

Example 9 includes the subject matter of Example 6, wherein information regarding the 5QIs includes information regarding the mapping of the 5QIs to the DSCPs, and wherein the IOC corresponding to the 5QIs includes a 5QiDscpMappingSet IOC.

Example 10 includes the subject matter of Example 9, wherein the 5QiDscpMappingSet IOC include an attribute inherited from a Top IOC.

Example 11 includes the subject matter of Example 10, wherein the attribute inherited from the Top IOC includes an attribute name 5QIDscpMappingList that is readable, writable, not invariant and notifiable.

Example 12 includes the subject matter of Example 1, further including a communication component coupled to the one or more processors to communicate with the service consumer.

Example 13 includes a tangible non-transitory computer-readable storage medium storing instructions which, when executed by one or more processors of a device hosting a service producer in a New Radio (5G) system (5GS), cause the one or more processors to execute the instructions to perform operations including: decoding a request from a service consumer to manage one or more 5G quality of service (QoS) indicators (5QIs), each 5QI including a 5QI value and corresponding 5QI characteristics; configuring one or more network functions (NFs) of the 5GS with the 5QIs based on the request; and encoding for transmission to the service consumer a message including a result of managing the one or more 5QIs.

Example 14 includes the subject matter of any one of Examples 13, wherein the request includes a request to one of configure the 5QIs or to obtain the 5QIs.

Example 15 includes the subject matter of any one of Examples 13, wherein the one or more NFs include a session management function (SMF), and/or a 5G Node B (gNB) central unit (CU) control plane (CP) (gNB CU-CP) and/or a gNB CU user plane (gNB-CU-UP).

Example 16 includes the subject matter of any one of Examples 13, wherein the request includes a request to at least one of configure a mapping of the 5QIs to a differentiated services code point (DSCP), or obtain a mapping of the 5QIs to DSCP, the operations further including causing, in response to the request, at least one of a mapping of the 5QIs to DSCP or a transmission to the service consumer of the mapping of the 5QIs to the DSCP.

Example 17 includes the subject matter of any one of Examples 13-16, wherein the characteristics include at least one of a resource type, a priority level, a packet delay budget, a packet error rate, or an averaging window.

Example 18 includes the subject matter of any one of Examples 17, wherein the packet error rate corresponds to an attribute name of scalar or exponent, and is readable, no invariant, and notifiable, and that is further either writable or not writable.

Example 19 includes the subject matter of any one of Examples 13-18, wherein the one or more processors are to process messages including information regarding the 5QIs using managed object instances (MOIs) of an information object class (IOC) corresponding to the 5QIs.

Example 20 includes the subject matter of claim 19, wherein, when the one or more NFs include the SMF, and/or the gNB-CU-CP and/or the gNB-CU-UP, the IOC corresponds to a Configurable5QIset having an attribute name Configurable5QIs that is readable, writable, configurable and notifiable.

Example 21 includes the subject matter of claim 18, wherein information regarding the 5QIs includes information regarding the mapping of the 5QIs to the DSCPs, and wherein the IOC corresponding to the 5QIs includes a 5QiDscpMappingSet IOC.

Example 22 includes the subject matter of claim 21, wherein the 5QiDscpMappingSet IOC include an attribute inherited from a Top IOC.

Example 23 includes the subject matter of any one of Examples 22, wherein the attribute inherited from the Top IOC includes an attribute name 5QIDscpMappingList that is readable, writable, not invariant and notifiable.

Example 24 includes the subject matter of any one of Examples 13, the operations further including communicating with the service consumer over an interface.

Example 25 includes a method to be performed at a device hosting a service producer in a New Radio (5G) system (5GS) including: decoding a request from a service consumer to manage one or more 5G quality of service (QoS) indicators (5QIs), each 5QI including a 5QI value and corresponding 5QI characteristics; configuring one or more network functions (NFs) of the 5GS with the 5QIs based on the request; and encoding for transmission to the service consumer a message including a result of managing the one or more 5QIs.

Example 26 includes the subject matter of Example 25, wherein the request includes a request to one of configure the 5QIs or to obtain the 5QIs.

Example 27 includes the subject matter of Example 25, wherein the one or more NFs include a session management function (SMF), and/or a 5G Node B (gNB) central unit (CU) control plane (CP) (gNB CU-CP) and/or a gNB CU user plane (gNB-CU-UP).

Example 28 includes the subject matter of Example 25, wherein the request includes a request to at least one of configure a mapping of the 5QIs to a differentiated services code point (DSCP), or obtain a mapping of the 5QIs to DSCP, further including causing, in response to the request, at least one of a mapping of the 5QIs to DSCP or a transmission to the service consumer of the mapping of the 5QIs to the DSCP.

Example 29 includes the subject matter of any one of Examples 25-28, wherein the characteristics include at least one of a resource type, a priority level, a packet delay budget, a packet error rate, or an averaging window.

Example 30 includes the subject matter of Example 29, wherein the packet error rate corresponds to an attribute name of scalar or exponent, and is readable, no invariant, and notifiable, and that is further either writable or not writable.

Example 31 includes the subject matter of any one of Examples 25-30, wherein the one or more processors are to process messages including information regarding the 5QIs using managed object instances (MOIs) of an information object class (IOC) corresponding to the 5QIs.

Example 32 includes the subject matter of Example 31, wherein, when the one or more NFs include the SMF, and/or the gNB-CU-CP and/or the gNB-CU-UP, the IOC corresponds to a Configurable5QIset having an attribute name Configurable5QIs that is readable, writable, configurable and notifiable.

Example 33 includes the subject matter of Example 30, wherein information regarding the 5QIs includes information regarding the mapping of the 5QIs to the DSCPs, and wherein the IOC corresponding to the 5QIs includes a 5QiDscpMappingSet IOC.

Example 34 includes the subject matter of Example 33, wherein the 5QiDscpMappingSet IOC include an attribute inherited from a Top IOC.

Example 35 includes the subject matter of Example 34, wherein the attribute inherited from the Top IOC includes an attribute name 5QIDscpMappingList that is readable, writable, not invariant and notifiable.

Example 36 includes the subject matter of Example 25, further including communicating with the service consumer over an interface.

Example 37 includes a device to host a service consumer in a New Radio (5G) system (5GS), the device comprising: a memory to store instructions; and one or more processors coupled to the memory to execute the instructions to: encode, for transmission to a service producer in the 5GS, a request to manage one or more 5G quality of service (QoS) indicators (5QIs), each 5QI including a 5QI value and corresponding 5QI characteristics; and decode a message from the device to host the service producer including a result of managing the one or more 5QIs.

Example 38 includes the subject matter of Example 37, wherein the request includes a request to the service producer to one of configure the 5QIs to the service consumer or obtain the 5QIs from the service producer.

Example 39 includes the subject matter of Example 37, wherein the request includes a request to the service producer to configure the 5QIs to one or more network functions (NFs) of the 5GS, the one or more NFs including a session management function (SMF), and/or a 5G Node B (gNB) central unit (CU) control plane (CP) (gNB CU-CP) and/or a gNB CU user plane (gNB-CU-UP).

Example 40 includes the subject matter of Example 37, wherein the request includes a request to the service producer to at least one of configure a mapping of the 5QIs to a differentiated services code point (DSCP), or obtain a mapping of the 5QIs to DSCP from the service producer.

Example 41 includes the subject matter of any one of Examples 37-40, wherein the characteristics include at least one of a resource type, a priority level, a packet delay budget, a packet error rate, or an averaging window.

Example 42 includes the subject matter of Example 41, wherein the packet error rate corresponds to an attribute name of scalar or exponent, and is readable, no invariant, and notifiable, and that is further either writable or not writable.

Example 43 includes the subject matter of any one of Examples 37-42, wherein the one or more processors are to process messages including information regarding the 5QIs using managed object instances (MOIs) of an information object class (IOC) corresponding to the 5QIs.

Example 44 includes the subject matter of Example 43, wherein, when the one or more NFs include the SMF, and/or the gNB-CU-CP and/or the gNB-CU-UP, the IOC corresponds to a Configurable5QIset having an attribute name Configurable5QIs that is readable, writable, configurable and notifiable.

Example 45 includes the subject matter of Example 42, wherein information regarding the 5QIs includes information regarding the mapping of the 5QIs to the DSCPs, and wherein the IOC corresponding to the 5QIs includes a 5QiDscpMappingSet IOC.

Example 46 includes the subject matter of Example 45, wherein the 5QiDscpMappingSet IOC include an attribute inherited from a Top IOC.

Example 47 includes the subject matter of Example 46, wherein the attribute inherited from the Top IOC includes an attribute name 5QIDscpMappingList that is readable, writable, not invariant and notifiable.

Example 48 includes the subject matter of Example 37, further including a communication component coupled to the one or more processors to communicate with the service producer.

Example 49 includes a tangible non-transitory computer-readable storage medium storing instructions which, when executed by one or more processors of a device hosting a service consumer in a New Radio (5G) system (5GS), cause the one or more processors to execute the instructions to perform operations including: encoding, for transmission to a service producer in the 5GS, a request to manage one or more 5G quality of service (QoS) indicators (5QIs), each 5QI including a 5QI value and corresponding 5QI characteristics; and decoding a message from the device to host the service producer including a result of managing the one or more 5QIs.

Example 50 includes the subject matter of claim 49, wherein the request includes a request to the service producer to one of configure the 5QIs to the service consumer or obtain the 5QIs from the service producer.

Example 51 includes the subject matter of claim 49, wherein the request includes a request to the service producer to configure the 5QIs to one or more network functions (NFs) of the 5GS, the one or more NFs including a session management function (SMF), and/or a 5G Node B (gNB) central unit (CU) control plane (CP) (gNB CU-CP) and/or a gNB CU user plane (gNB-CU-UP).

Example 52 includes the subject matter of claim 49, wherein the request includes a request to the service producer to at least one of configure a mapping of the 5QIs to a differentiated services code point (DSCP), or obtain a mapping of the 5QIs to DSCP from the service producer.

Example 53 includes the subject matter of any one of Examples 49-52, wherein the characteristics include at least one of a resource type, a priority level, a packet delay budget, a packet error rate, or an averaging window.

Example 54 includes the subject matter of claim 53, wherein the packet error rate corresponds to an attribute name of scalar or exponent, and is readable, no invariant, and notifiable, and that is further either writable or not writable.

Example 55 includes the subject matter of any one of Examples 49-54, the operations further including processing messages including information regarding the 5QIs using managed object instances (MOIs) of an information object class (IOC) corresponding to the 5QIs.

Example 56 includes the subject matter of claim 55, wherein, when the one or more NFs include the SMF, and/or the gNB-CU-CP and/or the gNB-CU-UP, the IOC corresponds to a Configurable5QIset having an attribute name Configurable5QIs that is readable, writable, configurable and notifiable.

Example 57 includes the subject matter of claim 54, wherein information regarding the 5QIs includes information regarding the mapping of the 5QIs to the DSCPs, and wherein the IOC corresponding to the 5QIs includes a 5QiDscpMappingSet IOC.

Example 58 includes the subject matter of claim 57, wherein the 5QiDscpMappingSet IOC include an attribute inherited from a Top IOC.

Example 59 includes the subject matter of claim 58, wherein the attribute inherited from the Top IOC includes an attribute name 5QIDscpMappingList that is readable, writable, not invariant and notifiable.

Example 60 includes the subject matter of any one of Examples 49, the operations further including communicating with the service producer over an interface.

Example 61 includes a method to be performed at a device hosting a service consumer in a New Radio (5G) system (5GS), the method including: encoding, for transmission to a service producer in the 5GS, a request to manage one or more 5G quality of service (QoS) indicators (5QIs), each 5QI including a 5QI value and corresponding 5QI characteristics; and decoding a message from the device to host the service producer including a result of managing the one or more 5QIs.

Example 62 includes the subject matter of Example 61, wherein the request includes a request to the service producer to one of configure the 5QIs to the service consumer or obtain the 5QIs from the service producer.

Example 63 includes the subject matter of Example 61, wherein the request includes a request to the service producer to configure the 5QIs to one or more network functions (NFs) of the 5GS, the one or more NFs including a session management function (SMF) of a 5G core network (5GC) of the 5GS, and/or a 5G Node B (gNB) central unit (CU) control plane (CP) (gNB CU-CP) and/or a gNB CU user plane (gNB-CU-UP).

Example 64 includes the subject matter of Example 61, wherein the request includes a request to the service producer to at least one of configure a mapping of the 5QIs to a differentiated services code point (DSCP), or obtain a mapping of the 5QIs to DSCP from the service producer.

Example 65 includes the subject matter of any one of Examples 61-64, wherein the characteristics include at least one of a resource type, a priority level, a packet delay budget, a packet error rate, or an averaging window.

Example 66 includes the subject matter of Example 65, wherein the packet error rate corresponds to an attribute name of scalar or exponent, and is readable, no invariant, and notifiable, and that is further either writable or not writable.

Example 67 includes the subject matter of any one of Examples 61-66, the operations further including processing messages including information regarding the 5QIs using managed object instances (MOIs) of an information object class (IOC) corresponding to the 5QIs.

Example 68 includes the subject matter of Example 67, wherein, when the one or more NFs include the SMF, and/or the gNB-CU-CP and/or the gNB-CU-UP, the IOC corresponds to a Configurable5QIset having an attribute name Configurable5QIs that is readable, writable, configurable and notifiable.

Example 69 includes the subject matter of Example 66, wherein information regarding the 5QIs includes information regarding the mapping of the 5QIs to the DSCPs, and wherein the IOC corresponding to the 5QIs includes a 5QiDscpMappingSet IOC.

Example 70 includes the subject matter of Example 69, wherein the 5QiDscpMappingSet IOC include an attribute inherited from a Top IOC.

Example 71 includes the subject matter of Example 70, wherein the attribute inherited from the Top IOC includes an attribute name 5QIDscpMappingList that is readable, writable, not invariant and notifiable.

Example 72 includes the subject matter of any one of Examples 61, the operations further including communicating with the service producer over an interface.

Example 73 may include an apparatus comprising means to perform one or more elements of a method described in or related to any of the method examples above, or any other method or process described herein.

Example 74 may include one or more non-transitory computer-readable media comprising instructions to cause an electronic device, upon execution of the instructions by one or more processors of the electronic device, to perform one or more elements of a method described in or related to any of the method Examples above, or any other method or process described herein.

Example 75 may include an apparatus comprising logic, modules, or circuitry to perform one or more elements of a method described in or related to any of the method Examples above, or any other method or process described herein.

Example 76 may include a method, technique, or process as described in or related to any of the method Examples above, or portions or parts thereof.

Example 77 may include an apparatus comprising: one or more processors and one or more computer-readable media comprising instructions that, when executed by the one or more processors, cause the one or more processors to perform the method, techniques, or process as described in or related to any of the method Examples above, or portions thereof.

Example 78 may include a signal as described in or related to any of the method Examples above, or portions or parts thereof.

Example 79 may include a datagram, packet, frame, segment, protocol data unit (PDU), or message as described in or related to any of the method Examples above, or portions or parts thereof, or otherwise described in the present disclosure.

Example 80 may include a signal encoded with data as described in or related to any of the method Examples above, or portions or parts thereof, or otherwise described in the present disclosure.

Example 81 may include a signal encoded with a datagram, packet, frame, segment, protocol data unit (PDU), or message as described in or related to any of the method Examples above, or portions or parts thereof, or otherwise described in the present disclosure.

Example 82 may include an electromagnetic signal carrying computer-readable instructions, wherein execution of the computer-readable instructions by one or more processors is to cause the one or more processors to perform the method, techniques, or process as described in or related to any of the method Examples above, or portions thereof.

Example 83 may include a computer program comprising instructions, wherein execution of the program by a processing element is to cause the processing element to carry out the method, techniques, or process as described in or related to any of the method Examples above, or portions thereof.

Example 84 may include a signal in a wireless network as shown and described herein.

Example 85 may include a method of communicating in a wireless network as shown and described herein.

Example 86 may include a system for providing wireless communication as shown and described herein.

Example 87 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A device to host a service producer in a New Radio (5G) system (5GS), the device comprising: a memory to store instructions; and one or more processors coupled to the memory to execute the instructions to:
   decode a request from a service consumer to manage one or more 5G quality of service (QoS) indicators (5QIs), each 5QI including a 5QI value and corresponding 5QI characteristics, wherein the request includes a request to one of configure the 5QIs or to obtain the 5Qis, wherein the request includes:
   an Information Object Class (IOC) 5QICharacteristics that specifies, for an individual 5QI of the one or more 5QIs, an associated 5QI value and corresponding QoS characteristics, the 5QICharacteristics having attributes associated therewith including 5QI value, resourceType, priorityLevel, packetDelayBudget, PacketErrorRate, averaging Window, and maximumDataBurstVolume, the attributes being readable, not invariant and notifiable; and
   an IOC 5QIDscpMappingSet to configure a mapping of the 5QIs to a differentiated services code point (DSCP), the 5QIDscpMappingSet having an attribute 5QIDscpMappingList that is readable, writable, not invariant and notifiable, the 5QIDscpMappingList including a list of 5QIdscpMapping data types having attributes including 5QI values and dscp values;
   cause, in response to the request, at least one of a mapping of the 5QIs to DSCP or a transmission to the service consumer of the mapping of the 5QIs to the DSCP;
   configure one or more network functions (NFs) of the 5GS with the 5QIs based on the request; and
   encode for transmission to the service consumer a message including a result of managing the one or more 5QIs.

2. The device of claim 1, wherein the one or more NFs include at least one of a session management function (SMF) of a 5G core network (5GC) of the 5GS, a 5G Node B (gNB) central unit (CU) control plane (CP) (gNB CU-CP) or a gNB CU user plane (gNB-CU-UP).

3. The device of claim 1, wherein the packet error rate corresponds to an attribute name of scalar or exponent, and is readable, no invariant, and notifiable, and that is further either writable or not writable.

4. The device of claim 1, wherein the one or more processors are to process messages including information regarding the 5QIs using managed object instances (MOIs) of an information object class (IOC) corresponding to the 5QIs.

5. The device of claim 4, wherein, when the one or more NFs include at least one of the SMF, the gNB-CU-CP or the gNB-CU-UP, and the IOC corresponds to a Configurable5QIset having an attribute name Configurable5QIs that is readable, writable, configurable and notifiable.

6. The device of claim 1, wherein the 5QiDscpMappingSet IOC include an attribute inherited from a Top IOC.

7. The device of claim 1, further including a communication component coupled to the one or more processors to communicate with the service consumer.

8. A tangible non-transitory computer-readable storage medium storing instructions which, when executed by one or more processors of a device hosting a service producer in a New Radio (5G) system (5GS), cause the one or more processors to execute the instructions to perform operations including:
   decoding a request from a service consumer to manage one or more 5G quality of service (QoS) indicators (5QIs), each 5QI including a 5QI value and corresponding 5QI characteristics wherein the request includes:
   an Information Object Class (IOC) 5QICharacteristics that specifies, for an individual 5QI of the one or more 5QIs, an associated 5QI value and corresponding QoS characteristics, the 5QICharacteristics having attributes associated therewith including 5QI value, resourceType, priorityLevel, packetDelayBudget, PacketErrorRate, averaging Window, and maximumDataBurstVolume, the attributes being readable, not invariant and notifiable; and
   an IOC 5QIDscpMappingSet to configure a mapping of the 5QIs to a differentiated services code point (DSCP), the 5QIDscpMappingSet having an attribute 5QIDscpMappingList that is readable, writable, not invariant and notifiable;
   causing, in response to the request, at least one of a mapping of the 5QIs to DSCP or a transmission to the service consumer of the mapping of the 5QIs to the DSCP;
   configuring one or more network functions (NFs) of the 5GS with the 5QIs based on the request, wherein the request includes a request to one of configure the 5QIs or to obtain the 5QIs; and encoding for transmission to the service consumer a message including a result of managing the one or more 5QIs.

9. The storage medium of claim 8, wherein the one or more NFs include at least one of a session management function (SMF) of a 5G core network (5GC) of the 5GS, a 5G Node B (gNB) central unit (CU) control plane (CP) (gNB CU-CP) or a gNB CU user plane (gNB-CU-UP).

10. The storage medium of claim 8, wherein the packet error rate corresponds to an attribute name of scalar or exponent, and is readable, no invariant, and notifiable, and that is further either writable or not writable.

11. The storage medium of claim 8, wherein the one or more processors are to process messages including information regarding the 5QIs using managed object instances (MOIs) of an information object class (IOC) corresponding to the 5QIs.

12. The storage medium of claim 11, wherein, when the one or more NFs include at least one of the SMF, the gNB-CU-CP or the gNB-CU-UP, and the IOC corresponds to a Configurable5QIset having an attribute name Configurable5QIs that is readable, writable, configurable and notifiable.

13. The storage medium of claim 8, wherein the 5QiDscpMappingSet IOC include an attribute inherited from a Top IOC, the attribute inherited from the Top IOC including an attribute name 5QIDscpMappingList that is readable, writable, not invariant and notifiable.

14. A method to be performed at a device hosting a service producer in a New Radio (5G) system (5GS) including:
    decoding a request from a service consumer to manage one or more 5G quality of service (QoS) indicators (5QIs), each 5QI including a 5QI value and corresponding 5QI characteristics wherein the request includes:
        an Information Object Class (IOC) 5QICharacteristics that specifies, for an individual 5QI of the one or more 5QIs, an associated 5QI value and corresponding QoS characteristics, the 5QICharacteristics having attributes associated therewith including 5QI value, resourceType, priorityLevel, packetDelayBudget, PacketErrorRate, averaging Window, and maximumDataBurstVolume, the attributes being readable, not invariant and notifiable; and
        an IOC 5QIDscpMappingSet to configure a mapping of the 5QIs to a differentiated services code point (DSCP), the 5QIDscpMappingSet having an attribute 5QIDscpMappingList that is readable, writable, not invariant and notifiable;
    causing, in response to the request, at least one of a mapping of the 5QIs to DSCP or a transmission to the service consumer of the mapping of the 5QIs to the DSCP;
    configuring one or more network functions (NFs) of the 5GS with the 5QIs based on the request; and
    encoding for transmission to the service consumer a message including a result of managing the one or more 5QIs.

15. The method of claim 14, wherein the request includes a request to one of configure the 5QIs or to obtain the 5QIs.

16. The method of claim 14, wherein the one or more NFs include at least one of a session management function (SMF) of a 5G core network (5GC) of the 5GS, a 5G Node B (gNB) central unit (CU) control plane (CP) (gNB CU-CP) or a gNB CU user plane (gNB-CU-UP).

17. The method of claim 14, wherein the packet error rate corresponds to an attribute name of scalar or exponent, and is readable, no invariant, and notifiable, and that is further either writable or not writable.

* * * * *